O. P. LOOMIS.
PRESSURE GAGE.
APPLICATION FILED JUNE 10, 1908.
1,087,883.
Patented Feb. 17, 1914.
2 SHEETS—SHEET 1.
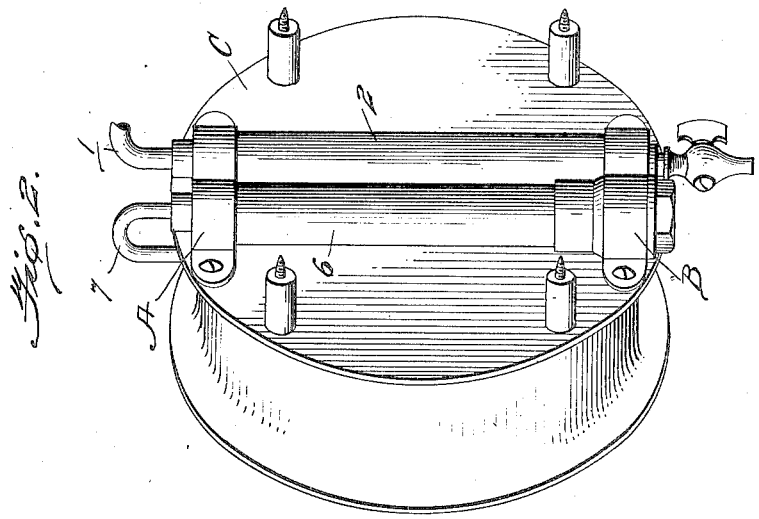
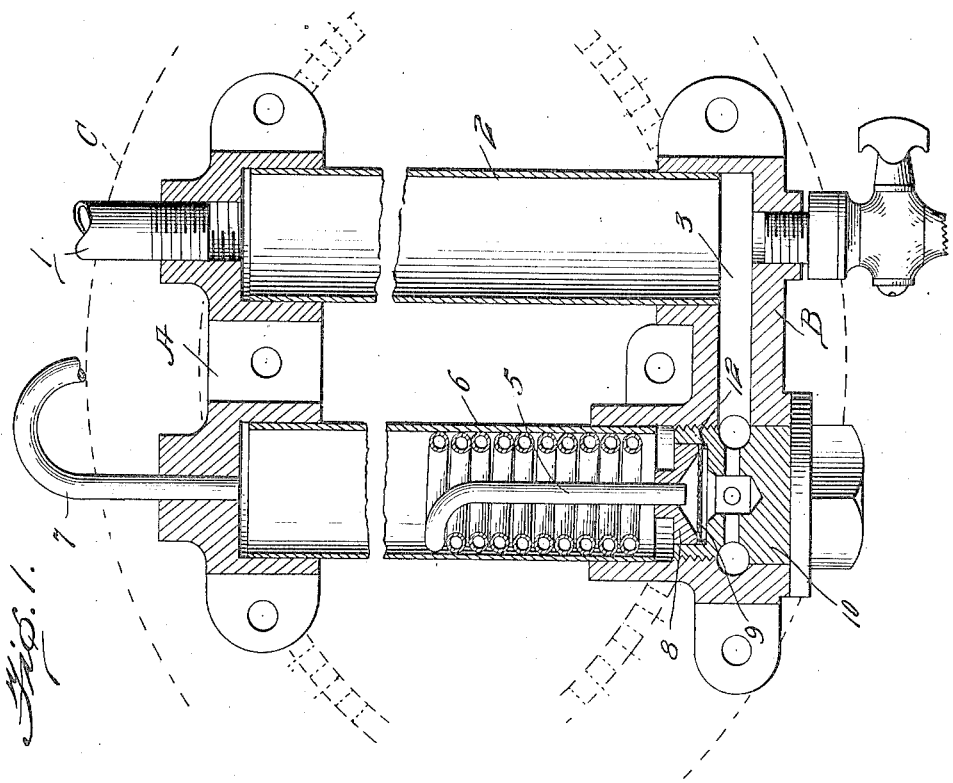
WITNESSES:
INVENTOR.
Osborn P. Loomis
BY
Byrnes, Townsend & Brickenstein
ATTORNEYS.

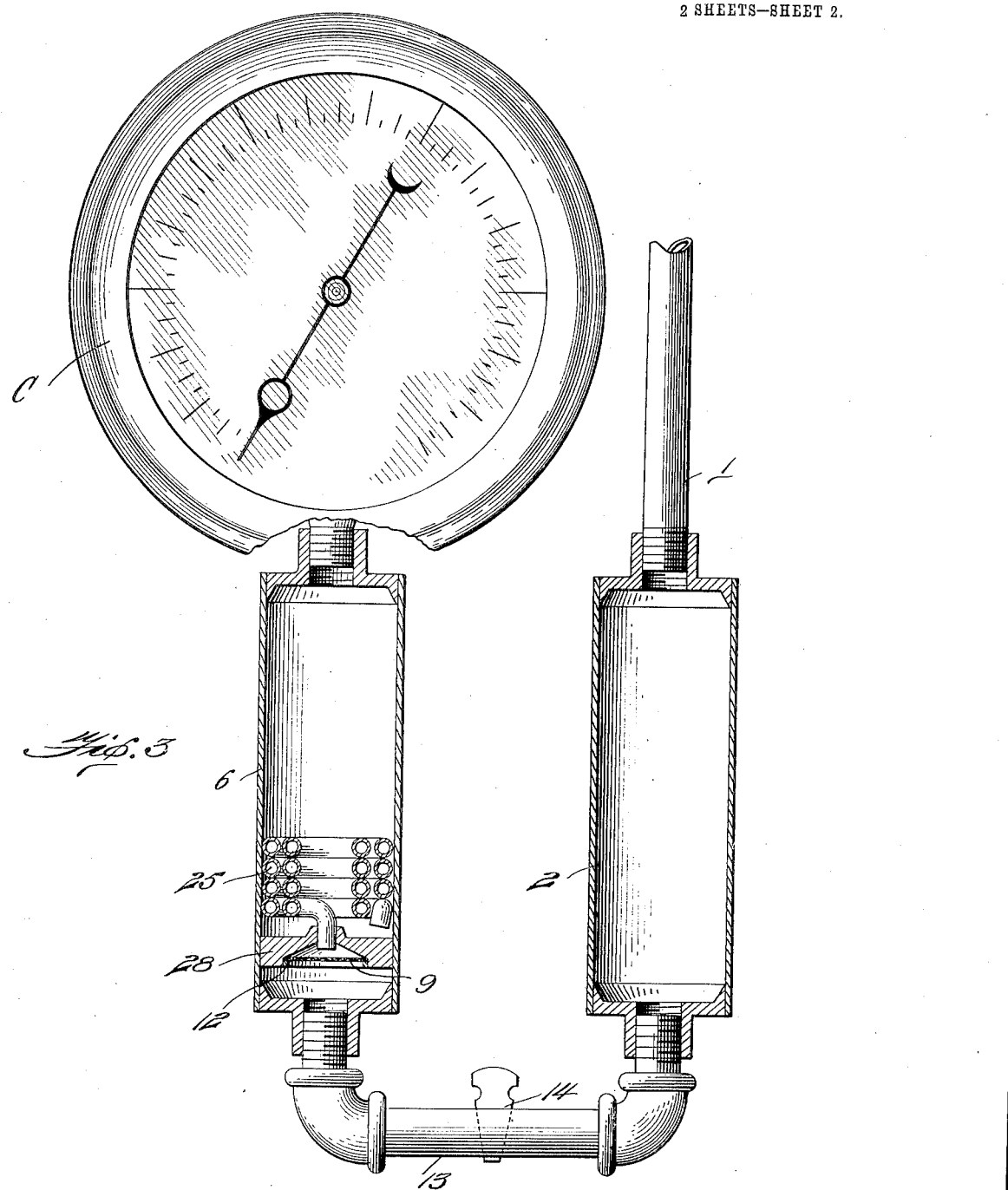

UNITED STATES PATENT OFFICE.

OSBORN P. LOOMIS, OF NEWPORT NEWS, VIRGINIA.

PRESSURE-GAGE.

1,087,883. Specification of Letters Patent. Patented Feb. 17, 1914.

Application filed June 10, 1908. Serial No. 437,735.

*To all whom it may concern:*

Be it known that I, OSBORN P. LOOMIS, a citizen of the United States, residing at Newport News, in the county of Warwick and State of Virginia, have invented certain new and useful Improvements in Pressure-Gages, of which the following is a specification.

This invention relates to an improvement in fluid pressure gages, and its object is to prevent the vibrations or oscillations of the gage pointer when subjected to varying pressures. For preventing such oscillations it has heretofore been customary to provide the gage with a valve or stop-cock, which is turned until a very-small aperture is left for the fluid, but inexperienced men are apt either to close the opening so far that the slightest collection of foreign matter blocks or stops the opening and the gage fails to register the rise or fall of pressure; or, if the opening is left too widely open, the sudden application of pressure results in such violent oscillations of the needle as to prevent reading the gage or in damage to the gage-mechanism.

By my improvement, a "dead-beat" or damped action of the pointer is obtained, by which all variations of pressure will be accurately registered and the pointer quickly brought to rest.

In the accompanying drawing Figure 1 is a sectional elevation, partly broken away, of my damping device, shown in this instance as mounted on the back of a gage. Fig. 2 is a perspective rear view on a smaller scale of the gage and damping device. Fig. 3 is a modified form shown partly in section.

Referring to Fig. 1 of the drawings, A and B represent two bridge-pieces or connections secured to the back of the gage casing C. Fitted into these bridge-pieces are pieces of tubing 2 and 6. A pipe 1 for admitting the pressure fluid is secured to the bridge-piece A and opens into the tube or chamber 2. A pipe 7 is connected preferably by soldering to the tube or chamber 6 and to the Bourdon mechanism of the gage, which may be of any desired construction. The lower bridge-piece is provided with a conduit 3, which connects the tubes or chambers 2 and 6, these tubes being preferably soldered to the bridge-piece B. Between the conduit 3 and the chamber 6 is an apertured diaphragm 8, preferably soldered in place, carrying a strainer 9, which may however be omitted. The strainer is held in place by a ring 12. This diaphragm is shown in Fig. 1 as mounted in a removable screw threaded plug 10, and has secured to it, as by soldering, a pipe 5, which extends upwardly and is then bent into a downwardly extending coil having its end opening near the bottom of the chamber 6. The plug 10 is provided with passages connecting the conduit 3 with the chamber beneath the strainer 9. As it is sometimes desirable to vary the length of the coiled tube, plugs can be made up with coils of varying length, which can be inserted after the devices are installed, thereby adjusting them accurately to the particular conditions of use. A drip-cock 11 is screwed into the connecting piece B, as shown.

A modified form of device is shown in Fig. 3. In this arrangement, the tubes 2 and 6, are mounted, as shown, instead of on the back of the gage. The tubes or chambers 2 and 6, are connected by a tube 13, having therein a valve or stop-cock 14. The diaphragm 28 is soldered directly to the tube 6, and has a strainer 9, secured in place by a ring 12, as in the form shown in Fig. 1.

In operation the chamber 2 is filled with liquid, as with water from condensation of steam when the device is used as a steam gage. The pressure forces the water from the chamber 2 up through the strainer 9 and the coiled pipe 5 into the compression chamber 6, which contains air, the varying compression of the air causing the Bourdon tube to operate the registering or indicating mechanism. The friction of the fluid in the tube 5 has a throttling effect sufficient to reduce the impulses caused by wide variations of pressure, this throttling together with the cushioning effect of the air in the chamber 6, being sufficient to prevent the transmission of any violent impulse to the indicating mechanism.

While I prefer to use a tube having an extended internal surface, this tube may be omitted and a like throttling effect be produced by partial closure of a stop-cock, as 14 (Fig. 3). Owing to the cushioning effect of the air chamber, a larger opening of the cock is permissible, than when such chamber is not used.

As a result of the combined throttling and cushioning actions, all variations of pressure are quickly and accurately indicated by the gage, the movement of the needle being damped so that there is no jerky action and no continued vibration. I find also, that, in certain cases, my device works well without any water in the tubes 2 and 6. My device is also applicable for use with gas or other explosive engines, the pipe 1 being for such use directly connected to the explosive chamber of the gas engine cylinder. The gases passing through the pipe 1 are "throttled" or retarded by the small tube 5, and the cushion chamber 6 still further prevents these impulses from reaching the gage as before described with reference to the use of the device in connection with a steam gage.

I claim:

1. In a fluid pressure actuated pressure gage, a closed cushion chamber having an indicating mechanism directly connected thereto, and a conduit containing a throttled section leading thereinto.

2. In a fluid pressure actuated pressure gage, a closed cushion chamber having an indicating mechanism directly connected thereto, a chamber for pressure fluid and a conduit containing a throttled section connecting the two chambers.

3. In a fluid pressure actuated pressure gage, a closed cushion chamber having an indicating mechanism directly connected thereto, a conduit containing a throttled section and a strainer located between the source of pressure and the throttled section.

4. In a fluid actuated pressure gage the combination with a closed chamber having an indicating mechanism directly connected thereto, of a conduit for pressure fluid, an apertured diaphragm extending across said conduit, and a coiled tube connected to the aperture in the diaphragm and extending into the air chamber.

5. In a fluid pressure actuated pressure gage, a closed cushion chamber having an indicating mechanism directly connected thereto, a second chamber and a conduit containing a throttled section connecting the two chambers.

6. In a pressure gage, fluid-actuated indicating mechanism, an air chamber connected thereto, and a coiled tube located within the air chamber for admitting pressure fluid thereto.

7. In a pressure gage, fluid-actuated indicating mechanism, an air chamber connected thereto, and a coiled tube located within the air chamber for admitting pressure fluid thereto, such tube having its discharge end near the bottom of the chamber.

8. In a fluid actuated pressure gage the combination with a chamber having an indicating mechanism connected thereto, of a conduit for pressure fluid, and a removable screw plug having secured thereto a coiled pipe extending into the chamber, said plug having a passage therethrough for connecting the pipe to the conduit.

9. In a fluid actuated pressure gage the combination with a chamber having an indicating mechanism connected thereto, a second chamber, a conduit connecting the two chambers, and a removable screw plug having secured thereto a coiled pipe extending into said first mentioned chamber, said plug having passages connecting the pipe to the conduit.

10. In a pressure gage, an air chamber having mounted therein a throttling tube having a straight upwardly extending central portion and a spirally coiled portion extending downward to near the bottom of the chamber.

11. An externally screw-threaded plug having an opening therein, an open-ended tube having an outwardly extending straight portion whose end is secured in the opening and a reversely extending coiled portion.

12. An externally screw-threaded plug having an opening therein, a strainer mounted across said opening, an open-ended tube having an outwardly extending straight portion whose end is secured in the opening and a reversely extending coiled portion.

13. In a fluid actuated pressure gage, the combination with a chamber having an indicating mechanism directly connected thereto, of a conduit for pressure fluid, an apertured diaphragm extending across said conduit, and a supplemental conduit opening into the chamber and connected to the aperture, said supplemental conduit having an extended internal surface, whereby the fluid passing therethrough is frictionally retarded.

14. In a fluid actuated pressure gage, an air chamber having an indicating mechanism directly connected thereto, a conduit leading thereinto and a cock in said conduit.

In testimony whereof, I affix my signature in presence of two witnesses.

OSBORN P. LOOMIS.

Witnesses:
A. L. HOPKINS,
A. F. BOWEN.